(12) United States Patent
Goldberg

(10) Patent No.: US 9,148,613 B1
(45) Date of Patent: Sep. 29, 2015

(54) SYSTEMS, METHODS, AND SOFTWARE FOR MERGING VIDEO VIEWING CELLS

(75) Inventor: Royee Goldberg, Raanana (IL)

(73) Assignee: VERINT SYSTEMS LTD., Herzelia, Pitauch (IL)

(\*) Notice: Subject to any disclaimer, the term of this patent is extended or adjusted under 35 U.S.C. 154(b) by 420 days.

(21) Appl. No.: 13/592,972

(22) Filed: Aug. 23, 2012

Related U.S. Application Data

(60) Provisional application No. 61/526,961, filed on Aug. 24, 2011.

(51) Int. Cl.
*H04N 7/18* (2006.01)
*H04N 5/64* (2006.01)
*H04N 5/445* (2011.01)

(52) U.S. Cl.
CPC .................. *H04N 5/44591* (2013.01)

(58) Field of Classification Search
CPC ...... H04N 7/181; H04N 7/15; H04N 5/44591
USPC ............. 348/14.07–14.09, 14.11, 153, 159, 348/211.13, 218.1, 588, 584, 598; 715/788–790, 792, 800; 345/629, 630, 345/632, 633, 634
See application file for complete search history.

(56) References Cited

U.S. PATENT DOCUMENTS

| 4,630,110 | A | * | 12/1986 | Cotton et al. | 348/153 |
| 5,956,081 | A | * | 9/1999 | Katz et al. | 348/163 |
| 8,537,195 | B2 | * | 9/2013 | Duckworth et al. | 348/14.07 |
| 2012/0306929 | A1 | * | 12/2012 | Chalkov | 345/666 |
| 2013/0021524 | A1 | * | 1/2013 | Tang | 348/469 |

\* cited by examiner

*Primary Examiner* — Victor Kostak
(74) *Attorney, Agent, or Firm* — Meunier Carlin & Curfman

(57) ABSTRACT

Methods, systems, and software are provided herein that allow a user to view video and manipulate viewing cells on a multi-view mode. In a first example, a method of merging viewing cells in a video management system is disclosed. The method includes presenting a plurality of viewing cells to a user, where the plurality of viewing cells are capable of displaying video of a plurality of video capture devices. The method also includes receiving an instruction to merge at least two of the plurality of viewing cells into a merged viewing cell, and associating the merged viewing cell with one of the plurality of video capture devices.

18 Claims, 4 Drawing Sheets

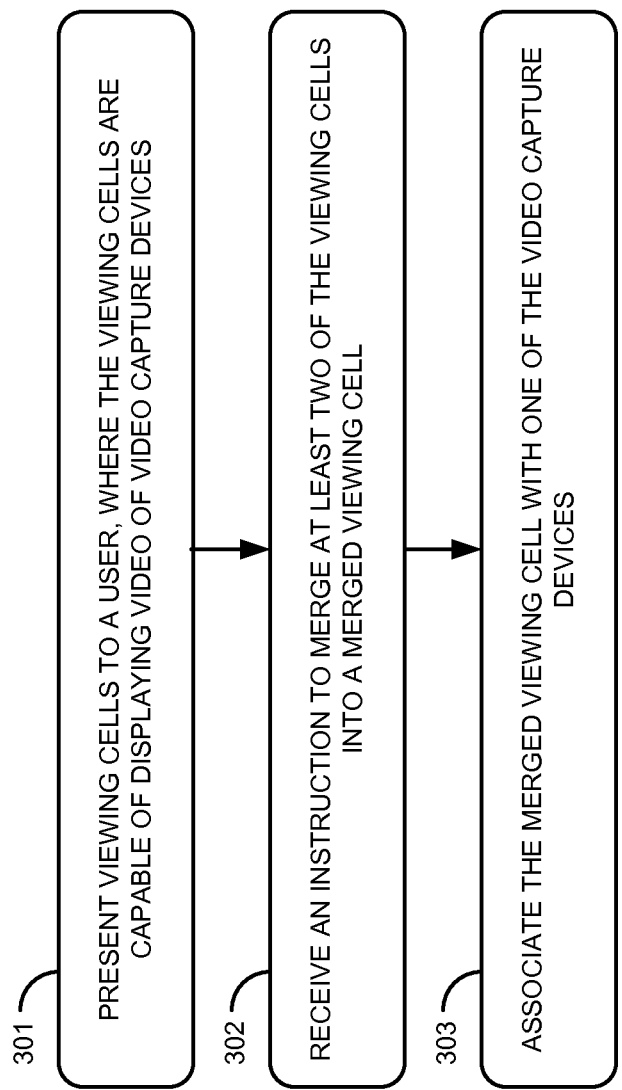

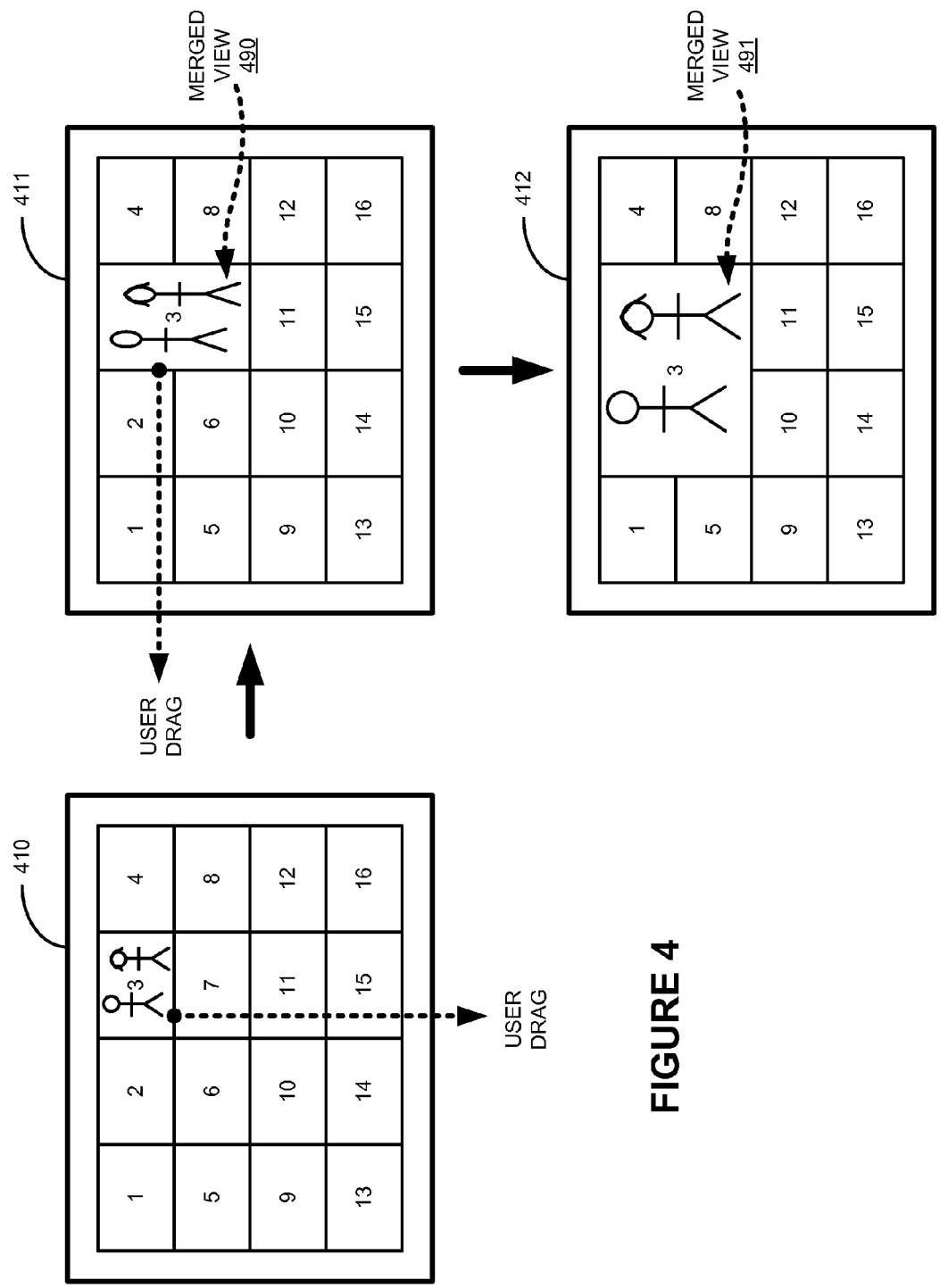

SYSTEMS, METHODS, AND SOFTWARE FOR MERGING VIDEO VIEWING CELLS

RELATED APPLICATIONS

This application claims the benefit of U.S. Provisional Application Ser. No. 61/526,961, filed on Aug. 24, 2011, and entitled "SYSTEMS, METHODS, AND SOFTWARE FOR MERGING VIDEO VIEWING CELLS", which is hereby incorporated by reference in its entirety.

TECHNICAL FIELD

Aspects of the disclosure are related to the field of video display and management systems, and in particular, merging video viewing cells used for displaying video from video capture devices in a video display or management system.

TECHNICAL BACKGROUND

Video surveillance and display systems typically include video capture devices, such as video cameras, linked to centralized equipment, such as servers, storage systems, video multiplexers, video processing equipment, or other equipment. The video capture devices could be situated in a location distant from the centralized equipment and be configured to transfer video over various links for collection, viewing, manipulation, and storage by the centralized equipment. After transfer, the video of the video capture devices can be viewed on a display device, such as video monitor or video display system.

Video monitoring systems, along with the associated video storage and handling equipment, may allow a user to view many videos simultaneously on the same display, such as in a split-screen or multi-video display mode. In some video monitoring systems, multi-video display configurations include a large central viewing cell surrounded by many smaller viewing cells, possibly arranged in a grid layout. Each of the viewing cells could display video from different sources. However, these video monitoring systems typically have predetermined viewing modes and fixed multi-video display configurations which can limit a user's ability to effectively view the video.

Overview

Methods, systems, and software are provided herein that allow a user to view video and manipulate viewing cells on a multi-view mode. In a first example, a method of merging viewing cells in a video management system is disclosed. The method includes presenting a plurality of viewing cells to a user, where the plurality of viewing cells are capable of displaying video of a plurality of video capture devices. The method also includes receiving an instruction to merge at least two of the plurality of viewing cells into a merged viewing cell, and associating the merged viewing cell with one of the plurality of video capture devices.

In a second example, a video management system for merging viewing cells is also disclosed. The video management system includes a user interface configured to present a plurality of viewing cells to a user, where the plurality of viewing cells are capable of displaying video of a plurality of video capture devices. The user interface is also configured to receive an instruction to merge at least two of the plurality of viewing cells into a merged viewing cell. The video management system also includes a processing system configured to associate the merged viewing cell with one of the plurality of video capture devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 3 is a flow diagram illustrating a method of operation of a video management system; and, FIG. 4 includes video configuration diagrams illustrating merging viewing cells.

DETAILED DESCRIPTION

Provided herein are solutions that allow users of a video management system to dynamically manipulate viewing cells in a multi-view video display screen. The viewing cells individually display video captured by video capture devices, such as live video or pre-recorded video. The configuration of the viewing cells on the display can be modified by merge operations, where the viewing cells are merged into larger viewing cells instead of having a fixed size and layout for the viewing cells.

Figure 1:
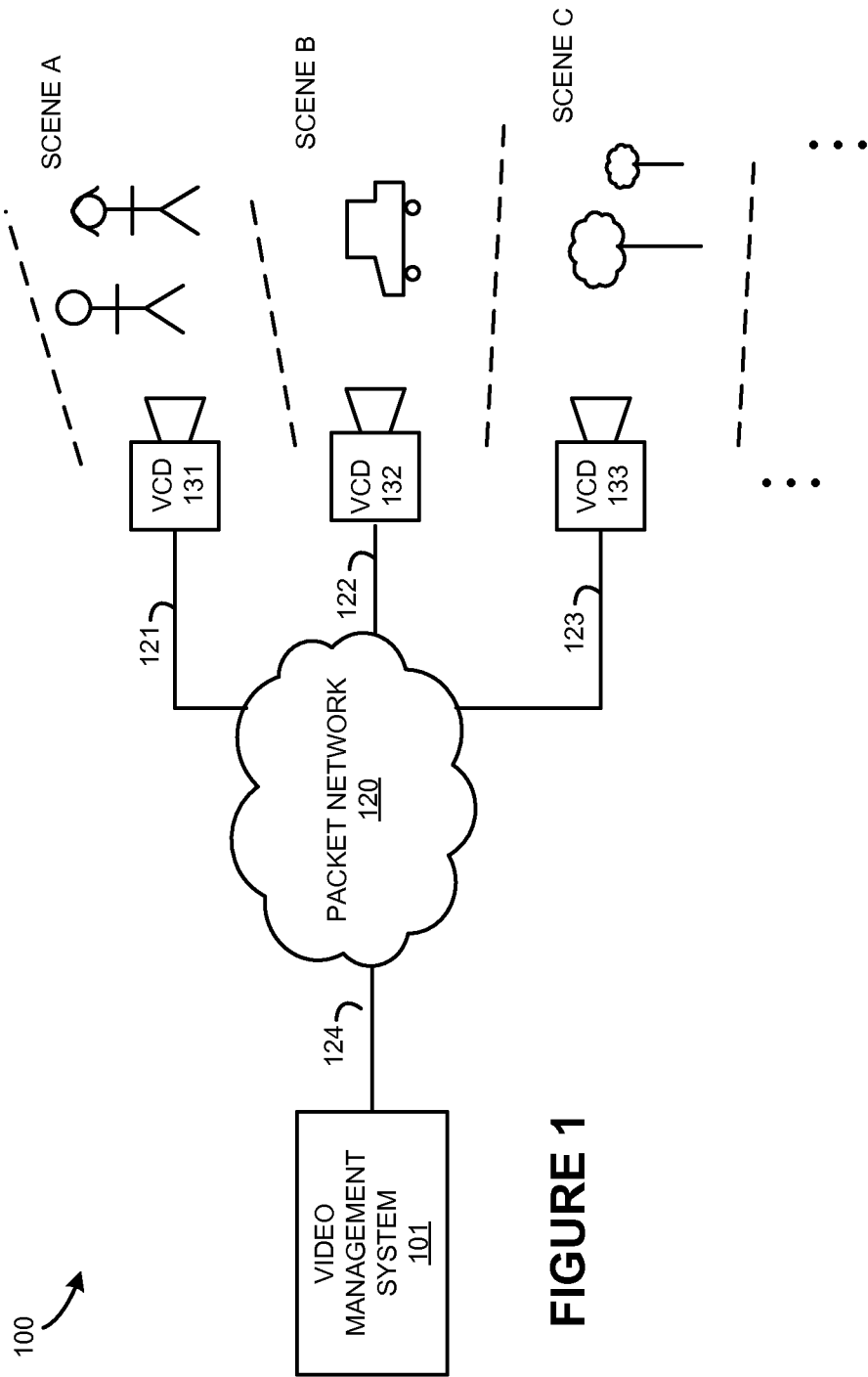
FIG. 1 is a system diagram illustrating a video system.

As a first example of a video management system, FIG. 1 is a system diagram illustrating video system 100. Video system 100 includes video management system 101, network 120, and video capture devices (VCD) 131-133. Video management system 101 and network 120 communicate over link 124. Video capture devices 131-133 and network 120 communicate over associated links 121-123.

In FIG. 1, each of VCD 131-133 can capture video of a particular scene, as indicated by associated scenes A-C. In typical examples, each of video capture devices 131-133 are configured to transfer the captured video over an associated link and network 120 for receipt by video management system 101 or other video equipment. The video is received by video management system 101, or other video equipment, for display, storage, archival, manipulation, or monitoring, among other operations.

Video management system 101 comprises communication interfaces, computer systems, user interfaces, display systems, microprocessors, circuitry, computer-readable media, or other processing devices or software systems, and may be distributed among multiple processing devices. Examples of video management system 101 may also include software such as an operating system, logs, utilities, drivers, databases, data structures, networking software, and other software stored on a computer-readable medium. Video management system 101 could also include video editing systems, video capture and storage systems, database systems, web servers, graphical user interfaces, or other systems.

VCD 131-133 each capture video and convert the video to a digital format for transfer over associated links 121-123. VCD 131-133 could each comprise Internet protocol (IP) video capture devices, digital video capture devices, or analog video capture devices, including combinations thereof. The digital format could include MPEG, H.264, Flash, VP8, JPEG video, among digital formats, and is transferred in a packet format, such as Ethernet, IP, or other packet formats, including combinations, variations, or improvements thereof. Three video capture devices are shown in FIG. 1 for clarity. It should be understood that a different number of video capture devices could be included. Although scenes A-C are shown as adjacent in FIG. 1, this is merely for illustrative purposes, and each of VCD 131-133 could be at different locations, and located distant from one another. Also, the images and scenes captured by each of VCD 131-133 are merely exemplary.

Network 120 includes equipment and systems to route video communications between endpoints. In some examples network 120 employs packet communications such as Ethernet, Internet protocol (IP), or other packet formats and protocols. Network 120 could comprise routers, switches, gateways, bridges, as well as various network links. In some examples, network 120 includes analog or digital video links. Although network 120 is shown in FIG. 1, it should be understood that various networks could be included, such as packet networks, local area networks, wide area networks, wireless networks, cellular voice and data networks, metropolitan area networks, among other networks and systems.

Links 121-124 each use metal, glass, optical, air, space, or some other material as the transport media. Links 121-124 each comprise a physical, logical, or virtual communication link, capable of communicating video, video packets, data, control signals, and communications, along with other information. Links 121-124 could each be a direct link or might include various equipment, intermediate components, systems, and networks. Links 121-124 may each include many different signals sharing the same link, as represented by the associated lines in FIG. 1, comprising channels, forward links, reverse links, user communications, communication sessions, frequencies, carriers, timeslots, transportation ports, logical transportation links, network sockets, packets, or communication directions.

Figure 2:
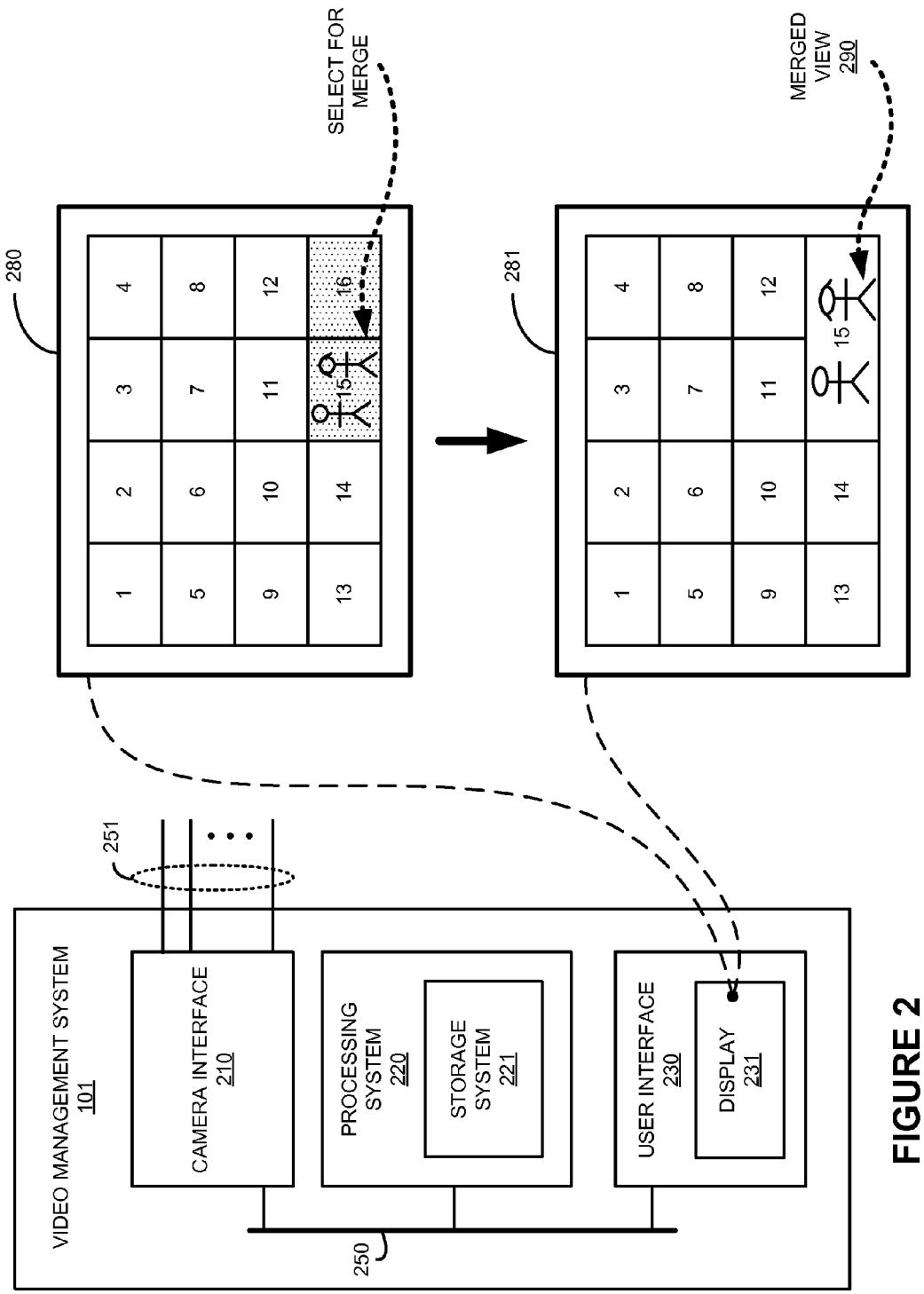
FIG. 2 is a system diagram illustrating a video management system.

FIG. 2 is a block diagram illustrating video management system 101, as found in FIG. 1, although video management system 101 could use other configurations. Video management system 101 includes camera interface 210, processing system 220, and user interface 230. Camera interface 210, processing system 220, and user interface 230 are shown to communicate over a common bus 250 for illustrative purposes. It should be understood that discrete links could be employed, such as data links, power links, video links, or other links. Video management system 101 may be distributed among multiple devices that together form the elements of FIG. 2.

Camera interface 210 includes circuitry and equipment to receive and process video from a plurality of video capture devices over links 251. Camera interface 210 could comprise network interfaces, transceivers, amplifiers, impedance matching circuitry, connectors, analog-to-digital converters, digital-to-analog converters, video processors, buffers, video compression processors, video encoding processors, or other circuitry and equipment. In typical examples, camera interface 210 receives digital video from cameras in a digital format, such as MPEG, H.264, Flash, VP8, or JPEG video, and could include various packet formats such as IP packets or Ethernet, or other digital video and packet formats. Camera interface 210 could encode, transcode, compress, or encrypt the video into a digital format, or change a digital format of the video to a different format. In further examples, camera interface 210 receives analog video from cameras in an analog format, such as NTSC, PAL, or other analog video format, and encodes the analog video into a digital format. In some examples, portions of functionality mentioned above for camera interface 210 are handled in processing system 220. Links 251 could use various protocols or communication formats as described herein for links 121-124, including combinations, variations, or improvements thereof.

Processing system 220 includes storage system 221. Processing system 220 retrieves and executes software 230 from storage system 221. In some examples, processing system 220 is located within the same equipment in which camera interface 210 or user interface 230 are located. In further examples, processing system 220 comprises specialized circuitry, and software 230 or storage system 221 could be included in the specialized circuitry to operate processing system 220 as described herein. Storage system 221 could include a non-transitory computer-readable medium such as a disk, tape, integrated circuit, server, flash memory, phase change memory, magnetic memory, optical memory, or some other memory device, and also may be distributed among multiple memory devices.

Software 230 may include an operating system, logs, utilities, drivers, networking software, and other software typically loaded onto a computer system. Software 230 could contain application programs, video editing and configuration programs, server software, firmware, or some other form of computer-readable processing instructions. When executed by processing system 220, software 230 directs processing system 220 to operate as described herein, such as present viewing cells to a user, receive instructions to combine, connect, unite, fuse, or otherwise merge viewing cells, and associate merged or combined viewing cells with video capture devices, among other operations.

User interface 230 includes equipment and circuitry for receiving user input and control, such as for receiving instructions for merging viewing cells or associating video capture devices with viewing cells, among other operations. Examples of the equipment and circuitry for receiving user input and control include a mouse, keyboard, push buttons, touch screens, selection knobs, dials, switches, actuators, keys, pointer devices, microphones, transducers, potentiometers, accelerometers, non-contact sensing circuitry, or other human-interface equipment. User interface 230 also includes display 231 to communicate information to a user of video management system 101, such as for presenting viewing cells, displaying video in viewing cells, and providing a graphical user interface for merging viewing cells, among other operations. Examples of display 231 include monitors, televisions, projectors, indicator lights, lamps, light-emitting diodes, or other display equipment. User interface 230 could also include haptic feedback devices, audible signal transducers, speakers, buzzers, alarms, vibration devices, or other indicator equipment, including combinations thereof. It should be understood that user interface 230 could comprise a network-based user interface, such as a terminal shell or other maintenance and control interface.

Bus 250 comprises a physical, logical, or virtual communication link, capable of communicating data, video information, or control signals, along with other information. In some examples, bus 250 is encapsulated within the elements of camera interface 210, processing system 220, or user interface 230, and may be a software or logical link. In other examples, bus 250 uses various communication media, such as air, space, metal, optical fiber, or some other signal propagation path, including combinations thereof. Bus 250 could be a direct link or might include various equipment, intermediate components, systems, and networks. Bus 250 could be a common link, shared link, or may be comprised of discrete, separate links.

FIG. 2 also includes video configurations 280-281. Video configurations 280-281 each comprise a configuration of a graphical user interface as displayed for a user of video management system 101, such as by display 231 of user interface 230. In video configuration 280, sixteen viewing cells are included, namely viewing cells numbered 1-16, although a different number of viewing cells could be included. Each of the viewing cells is capable of displaying video data to a user, and the video data could include live video as presently captured by video capture devices, or could include stored video, as previously captured by video capture devices and stored for later viewing. The video data is typically received over links 251, although in some examples, the video is transferred separately from links 251 and such as when stored on storage system 221 or other storage systems.

Initially, video configuration 280 includes sixteen equally-sized viewing cells, arranged in a grid pattern. For illustrative purposes, viewing cell 15 is shown as displaying a scene, such as that captured by VCD 131 of FIG. 1, although other scenes could be included. A user of video management system 101 then selects viewing cells 15 and 16 for merge. In some examples, video configuration 280 includes not only the video viewing cells, but a gridline separating the individual viewing cells. The user could select the viewing cells by selecting one or both of viewing cells 15 and 16, or selecting a gridline shared by viewing cells 15 and 16. The user could perform the selection process using a user input device or system as described herein, such as selecting the viewing cells or gridline with a mouse, cursor, or touchscreen device. Once the user selects the viewing cells for merge, video management system 101 may in some examples ask for a confirmation dialogue to confirm the merge operation.

In video configuration 281, the viewing cell configuration has been changed in response to the merge operation described above. Viewing cell 15 has been merged with viewing cell 16 to create merged view 290. In this example, viewing cell 15 has been expanded to include the previous viewing space occupied by viewing cell 16. Thus, video configuration 281 includes fifteen viewing cells, namely viewing cells 1-15, and viewing cell 16 has been eliminated from the viewing configuration in response to the merge. It should be understood that although in this example viewing cell 15 merges over viewing cell 16, in further examples, viewing cell 16 could be merged over viewing cell 15. Also, the viewing cell to be eliminated could be chosen by a user, prompted by a graphical user display confirmation, or based on a predetermined merge behavior. In further examples, such as when a user drags a gridline, the drag operation itself determines which viewing cell is expanded and which viewing cell is eliminated. For example, a user could drag the gridline between viewing cell 15 and viewing cell 16 to the right, which would indicate that viewing cell 15 is to be expanded and merged into viewing cell 16, where viewing cell 16 is decreased in size or eliminated entirely. The gridline previously shown between viewing cell 15 and viewing cell 16 has also been removed after the merge, and a new gridline configuration is now displayed in video configuration 281 of FIG. 2. It should also be understood that although the scene displayed in merged view 290 (after the merge operation) is shown as stretched, the scene could instead be zoomed, panned, cropped, or otherwise manipulated for display in merged view 290. In some examples, the scene is not manipulated, and only a portion of the scene associated with viewing cell 15 is shown.

In some examples, a video capture device is not yet associated with each of viewing cells 1-16, and the user could select which video capture device is associated with merged view 290. For example, the user could be prompted to select a video capture device to be associated with merged view 290. In other examples, the merge operation itself will determine which video capture device is associated with merged view 290, such as by keeping a previous video capture device association of the expanded viewing cell after the merge operation. In yet further examples, a video capture device can be associated with merged view 290 by associating one of the remaining viewing cells with merged view 290, possibly by a user click-dragging one of viewing cells 1-14 into the space occupied by merged view 290. It should be understood that other graphical and non-graphical user interface techniques could be applied to allow a user to associate merged view 290 with a video capture device.

FIG. 3 is a flow diagram illustrating a method of operating a video management system. The operations of FIG. 3 are referenced herein parenthetically, and could reflect the operation of video management system 101, although the operations could be applied to other video systems. For illustrative purposes, video management system 101 will be discussed in FIG. 3. In FIG. 3, video management system 101 presents (301) viewing cells to a user, where the viewing cells are capable of displaying video of at least video capture devices 131-133. The viewing cells are presented by a user interface of video management system 101, such as a video screen, monitor, display, television, or other video viewing equipment.

Video management system 101 receives (302) an instruction to merge at least two of the viewing cells into a merged viewing cell. The instruction could be entered by a user of video management system 101 via a graphical user interface or text-based interface, or could be an automated instruction, such as from a macro, shortcut, script, or other computer-readable instruction. In some examples, video management system 101 comprises a web page delivery system, such as a web site, and video management system 101 presents a user with a web interface for entering the instruction, as well as presenting the viewing cells. The instruction could comprise the user interface presenting gridlines associated with perimeters of the viewing cells to the user, and allowing the user to drag one of the gridlines to merge the at least two of the viewing cells.

Video management system 101 then associates (303) the merged viewing cell with one of the video capture devices. In some examples, a video capture device previously associated with one of the at least two merged viewing cells is associated with the merged viewing cell. In other examples, a user instructs video management system 101 to associate the merged viewing cell with a specific video capture device, such as through a graphical or text-based interface as described above. In yet further examples, the instruction to merge corresponds to an associated instruction to associate a video capture device, such as due to a direction of dragging a gridline during a merge, or an order of viewing cell selection during the merge operation. Once the merged viewing cell is associated with one of the video capture devices, then video management system 101 could display the video associated with the one of the video capture devices in the merged viewing cell. In further examples, the new configuration associated with the merged viewing cell is transferred to configure another system for display of the video of video capture devices 131-133.

FIG. 4 includes video configuration diagrams 410-412 illustrating sequential merging of viewing cells. In FIG. 4, a sequence of merging occurs, beginning with video configuration 410, proceeding through video configuration 411, and ending at video configuration 412. The operations described for FIG. 4 could be applied to video management system 101, although the operations could be applied to other video systems. Also, the scenes displayed in the viewing cells of FIG.

4 are merely illustrative, and could include any scene, including static non-video scenes used for configuration purposes.

In video configuration 410, an initial viewing cell configuration is presented. This viewing cell configuration could be a template configuration, a predetermined configuration, a default configuration, or a previously modified configuration. Each viewing cell 1-16 is separated from each other by gridlines. In other examples, each viewing cell could be separated from each other by a blank space or intermediate space which is larger than the gridlines shown. A user can select a gridline in video configuration 410, such as by a mouse click, text input, or other user input, and drag a gridline to create a merged viewing cell. In this example, a gridline between viewing cell 3 and viewing cell 7 is selected by a user and dragged downward, as indicated by the arrow. Video configuration 411 shows the result of the initial dragging of the gridline.

As shown in video configuration 411, viewing cell 3 has been expanded into the space previously occupied by viewing cell 7, resulting in a merged viewing cell, namely merged view 490. Merged view 490 is now a larger viewing cell, and could be configured to display video from a video capture device. In some examples, a video capture device is not yet associated with viewing cell 3 or merged view 490, and a video capture device could be later associated with merged view 491 in video configuration 412. However, the user could select a video capture device to associate with merged view 490, such as by a drag-and-drop operation with another viewing cell in video configuration 411. In other examples, a video capture device is associated by entering an identifier for a video capture device into a graphical dialogue box, a text-based entry, configuration file, or other input processes. In this example, however, viewing cell 3 has been previously associated with a video capture device as indicated by the scene shown in viewing cell 3. Once the merge operation is complete resulting in merged view 490, viewing cell 3 has been expanded onto the space occupied by viewing cell 7, and the original video capture device association for viewing cell 3 has been retained. The stretched scene in viewing cell 3 is merely exemplary to show the merging operation of the viewing cell, and the actual video scene might not be altered, or instead could be altered such as stretched, fit, zoomed, panned, expanded, contracted, cropped, or otherwise manipulated, including combinations thereof. The user could select the alteration style of the video associated with merged view 490.

Once merged view 490 is established, the user may desire to perform further merge operations on the viewing cells. In this example, the user can drag the gridline on the left side of merged view 490 to the left, as shown by the arrow in video configuration 411. Video configuration 412 shows viewing cell 3 expanded into the spaces previously occupied by viewing cells 2 and 6, creating merged view 491. The user interface could interpret the gridline drag in video configuration 411 as an expansion of viewing cell 3 to merge with viewing cells 2 and 6 since the gridline dragged is associated with an already merged view. Thus, merged view 491 is created with a large viewing cell 3 surrounded by the remaining viewing cells. In this example, a rectangular shape is maintained for merged view 490 during the second merge operation to create merged view 491 by merging viewing cell 3 with both viewing cell 2 and viewing cell 6 into merged view 490. As with merged view 490, merged view 491 could then have a video capture device associated therewith, or a preexisting video capture device association could be maintained after the second merge operation.

In other examples, if the gridline between merged view 490 and viewing cell 2 is dragged, then only viewing cell 2 would be merged into merged view 490. Thus, merged view 491 could be an irregular shape, such as an inverted "L" shape, with viewing cell 2 being merged into the space associated with previous merged view 490. This irregular shape can be useful when the scene to be monitored or displayed has in-scene obstacles, such as walls or buildings, and the area of interest in the scene is of an irregular or narrow shape, such as a hallway. The portion of the video actually displayed in the irregular merged view could be selected by a user, possibly by dragging the frame of the video to align objects in the scene with the shape of the viewing cell or to position the portion of interest in a scene within the visible boundaries formed by the viewing cell, especially in examples where the video scene is larger than the viewing cell—creating a panning effect.

Although many examples discussed herein present a gridline configuration to drag and merge viewing cells, other examples could be included. For instance, the interior of a viewing cell could be selected, such as by a mouse click or a finger touch, and the selected viewing cell could be dragged onto another viewing cell to create a merged viewing cell. Non-adjacent viewing cells could be merged by this drag-and-drop operation, and any interceding viewing cells could be eliminated in favor of the larger merged view. The user could select via a confirmation instruction which cell is to be expanded by the merge operations, or a default action could be employed such as where the dragged viewing cell expands over the other viewing cells. Associating the merged viewing cell with one of the video capture devices could include allowing a user to drag another viewing cell—not associated with the merge operation—into the merged viewing cell to associate the merged viewing cell with the video capture device correlated to the dragged viewing cell. In yet further examples, dragging a selected viewing cell onto a selected gridline could expand the selected viewing cell into the region defined by all viewing cells with perimeters adjacent to the selected gridline, resulting in multiple viewing cells being eliminated by the expanded selected viewing cell.

Also, the video management systems as described herein could be provided on a display during a specialized configuration mode of a video display system. The configuration mode could allow a user to resize, merge, move, or otherwise alter the viewing cells of a plurality of viewing cells as described herein. During the adjustment of the viewing cells, video may or may not be displayed in the viewing cells. In some examples, the configuration mode introduces static template images or predetermined video into each viewing cell, such as a graphical identifier associated with each viewing cell or identifiers associated with video capture devices, to aid the user in adjustment of the viewing cells. In other examples, active video, such as live video or pre-recorded video, is being presently displayed in at least one of the viewing cells during the merge operation, and the active video is dynamically altered according to the merge operations.

It should also be understood that the merge operations as performed herein can be reversed, such as by dividing a merged cell, or other viewing cell, into a plurality of sub-viewing cells. Thus, a larger number of viewing cells could be created, or a larger-sized viewing cell —such as due to merging—can be broken up into smaller viewing cells. Video capture devices could then be associated with each sub-viewing cell.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A computer-readable medium having program instructions stored thereon for operating a video management system to merge viewing cells, wherein said video management system comprises a camera interface, a processing system, and a user interface, such that when the computer-readable medium is executed by the video management system, the computer-readable medium directs the video management system to:
present a plurality of viewing cells to a user capable of displaying video from a plurality of video capture devices, wherein each viewing cell represents video from a different video capture device;
present gridlines associated with perimeters of the viewing cells to the user, and allow the user to drag one of the gridlines to merge at least two of the plurality of viewing cells;
receive an instruction to merge the at least two of the plurality of viewing cells into a merged viewing cell; and
associate the merged viewing cell with one of the plurality of video capture devices.

2. The computer-readable medium of claim 1, wherein the instructions further direct the video management system to display the video associated with the one of the plurality of video capture devices in the merged viewing cell.

3. The computer-readable medium of claim 1, wherein the instructions further direct the video management system to allow the user to drag the one of the gridlines to merge the at least two of the plurality of viewing cells while the viewing cells are displaying the video.

4. The computer-readable medium of claim 1, wherein the instructions further direct the video management system to allow the user to drag the one of the gridlines to merge the at least two of the plurality of viewing cells in a configuration mode where the viewing cells are not displaying the video.

5. The computer-readable medium of claim 1, wherein the merged viewing cell is associated with a video capture device corresponding to one of the at least two of the plurality of viewing cells.

6. The computer-readable medium of claim 5, wherein the video capture device is selected by the user.

7. The computer-readable medium of claim 1, wherein the instructions further direct the video management system to allow a user to drag another viewing cell into the merged viewing cell to associate the merged viewing cell with a video capture device correlated to the other viewing cell.

8. The computer-readable medium of claim 1, wherein the instructions further direct the video management system to display a graphical user interface comprising the plurality of viewing cells to present the plurality of viewing cells to the user, and wherein the instruction to merge comprises a user instruction received through the graphical user interface.

9. The computer-readable medium of claim 1, wherein the instructions further direct the video management system to receive a second instruction to merge a further one of the plurality of viewing cells into the merged viewing cell, and associate the merged viewing cell with a second one of the plurality of video capture devices.

10. A video management system for merging viewing cells, comprising:
a camera interface;
a user interface configured to present a plurality of viewing cells to a user, wherein the plurality of viewing cells are capable of displaying video from a plurality of video capture devices, wherein each viewing cell represents video from a different video capture device;
the user interface configured to present gridlines associated with perimeters of the viewing cells to the user, and to allow the user to drag one of the gridlines to merge at least two of the plurality of viewing cells;
the user interface configured to receive an instruction to merge the at least two of the plurality of viewing cells into a merged viewing cell; and
a processing system configured to associate the merged viewing cell with one of the plurality of video capture devices.

11. The video management system of claim 10, comprising:
the user interface configured to display the video associated with the one of the plurality of video capture devices in the merged viewing cell.

12. The video management system of claim 10, comprising:
the user interface configured to allow the user to drag the one of the gridlines to merge the at least two of the plurality of viewing cells while the viewing cells are displaying the video.

13. The video management system of claim 10, comprising:
the user interface configured to allow the user to drag the one of the gridlines to merge the at least two of the plurality of viewing cells in a configuration mode where the viewing cells are not displaying the video.

14. The video management system of claim 10, wherein the merged viewing cell is associated with a video capture device corresponding to one of the at least two of the plurality of viewing cells.

15. The video management system of claim 14, wherein the video capture device is selected by the user.

16. The video management system of claim 10, wherein the user interface is configured to allow a user to drag another viewing cell into the merged viewing cell to associate the merged viewing cell with a video capture device correlated to the other viewing cell.

17. The video management system of claim 10, wherein the user interface is configured display a graphical user interface comprising the plurality of viewing cells, and receive a user instruction through the graphical user interface as the instruction to merge.

18. A method of merging viewing cells in a video management system,
wherein said video management system comprises a camera interface, a processing system, and a user interface, the method comprising:
presenting a plurality of viewing cells to a user capable of displaying video from a plurality of video capture devices, wherein each viewing cell represents video from a different video capture device;
presenting gridlines associated with perimeters of the viewing cells to the user, and allowing the user to drag one of the gridlines to merge at least two of the plurality of viewing cells;
receiving an instruction to combine the at least two of the plurality of viewing cells into a merged viewing cell; and
associating the combined viewing cell with one of the plurality of video capture devices.

* * * * *